No. 647,863. Patented Apr. 17, 1900.
W. NACHTWEY.
HAND PROPELLED VEHICLE.
(Application filed Apr. 26, 1899.)

(No Model.)

Witnesses:
Jas. E. Hutchinson
Henry C. Hazard.

Inventor
William Nachtwey, by
Prindle and Russell, his Attys

UNITED STATES PATENT OFFICE.

WILLIAM NACHTWEY, OF KEWANEE, ILLINOIS.

HAND-PROPELLED VEHICLE.

SPECIFICATION forming part of Letters Patent No. 647,863, dated April 17, 1900.

Application filed April 26, 1899. Serial No. 714,557. (No model.)

*To all whom it may concern:*

Be it known that I, WILLIAM NACHTWEY, a citizen of the United States, residing at Kewanee, in the county of Henry, and in the State of Illinois, have invented certain new and useful Improvements in Hand-Propelled Vehicles; and I do hereby declare that the following is a full, clear, and exact description thereof, reference being had to the accompanying drawings, in which—

Figure 1:
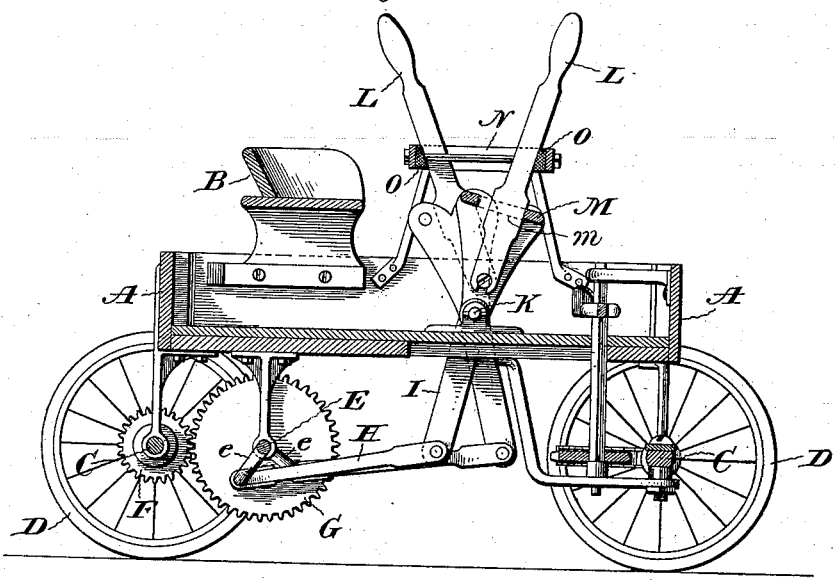
Figure 2:
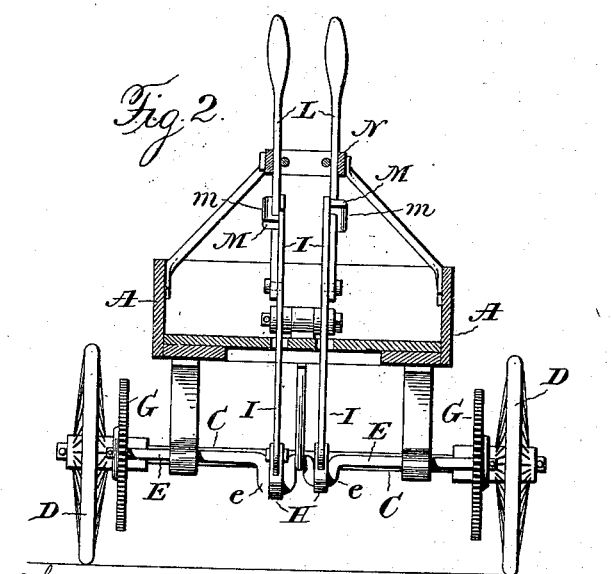
Figure 3:
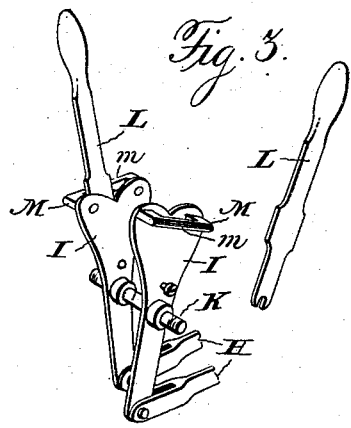

Figure 1 is a longitudinal section of a vehicle embodying my invention; Fig. 2, a detail view in cross-section on the line $xx$ of Fig. 1, and Fig. 3 a detail view in perspective of the operating-levers.

Letters of like name and kind refer to like parts in each of the figures.

The object of my invention is to provide improvements in driving mechanism of the lever-and-crank type; and to this end said invention consists in the mechanism having the construction and combination of parts substantially as hereinafter specified.

I have designed my invention for and illustrate it as embodied in a vehicle having four supporting-wheels; but it is to be understood that such embodiment is merely illustrative and not intended to be restrictive of the use of the invention.

In the embodiment of my invention in a four-wheeled vehicle I employ a suitable body A, containing a seat B and mounted upon front and rear axles C and C, each carrying two wheels D and D, preferably of the same construction as bicycle-wheels. The front axle has, as usual, a pivoted or swiveled connection with the body A for steering purposes, and suitable foot-operated steering devices are provided for managing said axle. Each of the rear-axle wheels D is journaled to turn on the axle, and each by suitable gearing is connected with a crank-shaft E, mounted in bearings depending from the body A and supporting said shaft crosswise of the latter. Said gearing may, as shown, be simply two meshing toothed wheels F and G, fastened, respectively, to the wheel D and shaft E, or sprocket-wheels and chain may be the form of gearing. There are two cranks $e$ and $e$ on the shaft E and placed ninety degrees apart, so as to avoid a dead-center, and each crank is connected by a pitman H with the lower end of an operating-lever I, that passes through an opening in the bottom of the body A and is pivoted on a rod or shaft K, secured on the floor of the body A. Pivoted detachably to the side of the lever I is a supplemental hand-lever L, whose axis of motion is parallel with or extends in the same direction as the axis of the lever I, so that the two levers are capable of independent motion. The amount of possible independent movement is fixed by stops or projections M and M on the side of the lever I, to respectively engage opposite edges of the lever L at the desired limit of motion in both directions. Preferably a bar or connecting-piece $m$ extends between the projections and serves to confine or hold the hand-lever to the side of the lever I. The hand-lever K at a point above the top of the lever I passes between parallel guide-bars N and N, that have stops O and O at their extremities to respectively engage the opposite edges of the lever K, and thus arrest its motion in one direction or the other. The two sets of bars N and N are suitably attached to and supported by the body A. The distance between the stops O and O is such that the angular motion of the lever K is considerably less than the angular motion of the lever I, and this is the purpose of the compound-lever construction, to the end that with a given radius of crank $e$ a much shorter movement of the operating-lever, and consequently less stretch of the arm of the operator, can be had than with an ordinary simple lever. In working with the compound lever the two levers I and K will when power is applied to the handle-lever K be moved together by reason of the engagement of the latter with that one of the projections $m$ which is on the advancing side of the lever K, and though the latter is arrested in its movement by a stop O before the lever I completes its movement yet by reason of its momentum said lever I will continue and complete its movement, carrying the just-engaged projection $m$ away from the lever K and bringing the other projection $m$ to the lever K in position to be engaged by the latter on the reverse movement thereof. Thus by my invention the advantage of a crank of long radius is secured with a comparatively-short movement of the handle member of the operating-lever. With the two compound levers working alternately the crank-shaft is continuously revolved and without undue stretching or reach of the arms of the operator.

Having thus described my invention, what I claim is—

1. The combination of a shaft to be revolved, a power-transmitting device comprising two independently-movable members, connections between one of said members and the shaft, means coöperating with the other member to limit its movement to a shorter distance than that of the shaft-connected member, and a loose connection between the two members, whereby power may be transmitted to the shaft-connected member by, and the latter may continue its movement independent of the other member, substantially as and for the purpose described.

2. The combination of a shaft to be revolved, a lever connected with said shaft, a second lever pivoted to swing in the same direction as the first, projections on the first lever on opposite sides of the second lever, and means to coöperate with the second lever to cause relative movement of the levers and thus limit the second lever to a shorter angular movement than that of the first lever, substantially as and for the purpose described.

3. The combination of the crank-shaft, a lever connected with the same, carrying projections, a second lever pivoted to the first, and extending through the space between the projections, and fixed stops to engage the second lever when it has moved a shorter angular distance than the first lever, said stops being respectively, on opposite sides of said second lever, in the path of movement thereof substantially as and for the purpose described.

4. The combination of a vehicle-body, carrying-wheels therefor, a crank-shaft mounted on said body and geared to certain of the wheels, two operating-levers connected, respectively, to two cranks on the crank-shaft, each of which levers is composed of two pivoted members, having a loose connection, whereby one can move independently of the other, and means to restrict one member to less angular movement than the other, substantially as and for the purpose described.

In testimony that I claim the foregoing I have hereunto set my hand this 18th day of April, A. D. 1899.

WILLIAM NACHTWEY.

Witnesses:
CHAS. J. WILLIAMSON,
JAS. E. HUTCHINSON.